Figure 1:
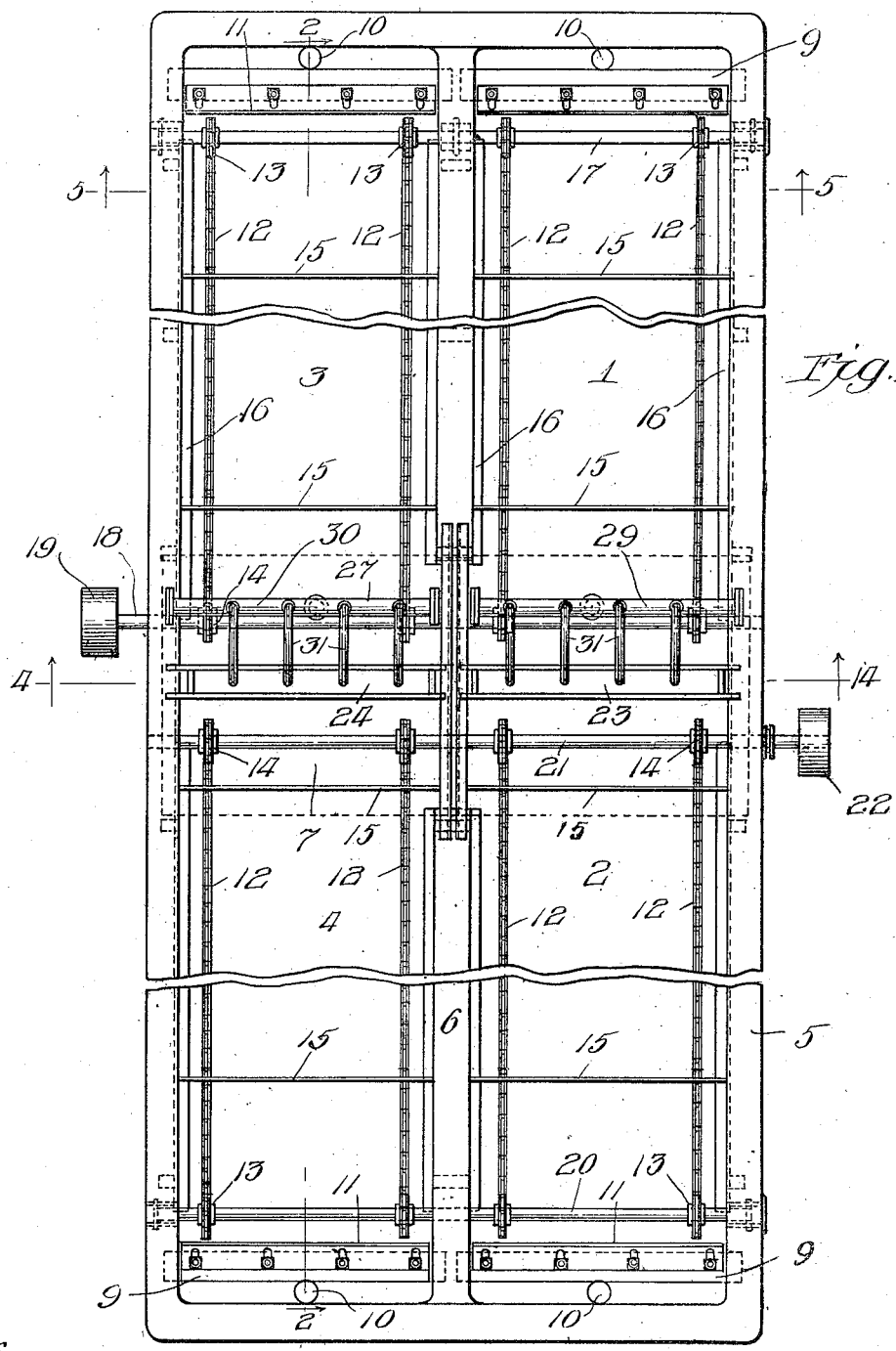

L. P. BAUER.
APPARATUS AND PROCESS FOR PURIFYING STARCH.
APPLICATION FILED APR. 21, 1913.

1,161,826.

Patented Nov. 30, 1915.

L. P. BAUER.
APPARATUS AND PROCESS FOR PURIFYING STARCH.
APPLICATION FILED APR. 21, 1913.

1,161,826.

Patented Nov. 30, 1915.
4 SHEETS—SHEET 2.

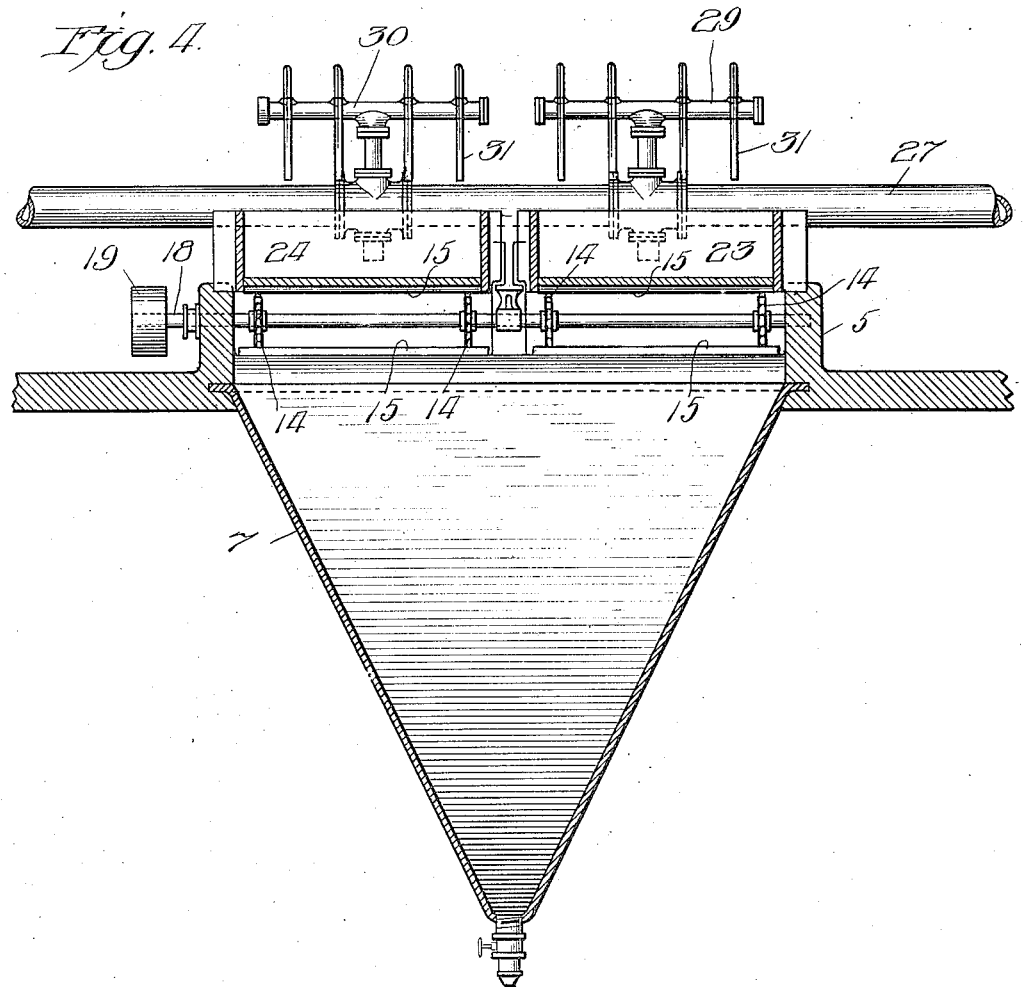
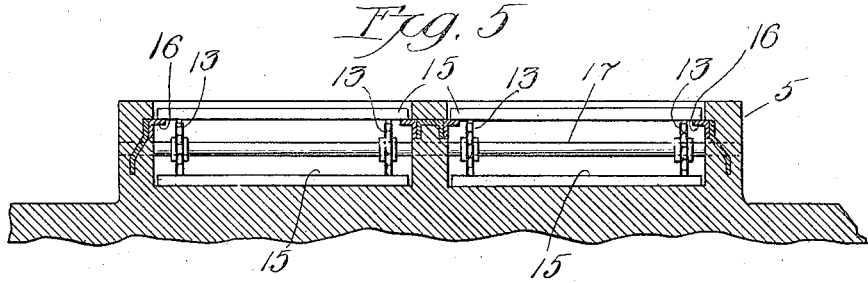

UNITED STATES PATENT OFFICE.

LOUIS P. BAUER, OF PEKIN, ILLINOIS.

APPARATUS AND PROCESS FOR PURIFYING STARCH.

1,161,826.  Specification of Letters Patent.  Patented Nov. 30, 1915.

Application filed April 21, 1913. Serial No. 762,673.

*To all whom it may concern:*

Be it known that I, LOUIS P. BAUER, a citizen of the United States, residing at Pekin, county of Tazewell, State of Illinois, have invented a certain new and useful Improvement in Apparatus and Processes for Purifying Starch, and declare the following to be a full, clear, and exact description of the same, such as will enable others skilled in the art to which it pertains to make and use the same, reference being had to the accompanying drawings, which form a part of this specification.

My invention relates to the art of separating from each other and recovering in pure form substances which are held in suspension in a common liquid medium, where such substances differ materially from each other in specific gravity or in their capability of settling in the liquid medium under prescribed conditions: for example, the separation of the gluten and other lighter materials from the ground starch with which they are mixed and from which they must be removed in order to produce pure starch.

I have found that in watery starch mixture containing gluten the first action is for the starch to begin to settle, the gluten tending to rise to the surface where, under most conditions, it remains for a short time and then begins to settle with the starch so that no permanent separation of the starch and gluten occurs. Thus if the watery mixture is poured into a receptacle and allowed to stand, the starch will immediately begin to settle, carrying with it the greater part of the gluten, and the rest of the gluten will rise to the top where it remains momentarily and then settles with the starch. I have also found that the gluten may be prevented from settling after it has risen to the top by moving it horizontally at a speed of about twelve or thirteen feet a minute. If the rate of travel be much slower than this, the gluten will settle. It is a further characteristic of watery starch that the starch will settle into a compact mass very quickly if allowed to do so, this being true whether the mixture is poured into a receptacle and allowed to stand or whether it is poured upon a table or the like and allowed to flow along the table. In fact, the common method of purifying starch is to allow the impure watery mixture to trickle over a table, the starch settling into a compact mass on the table and some of the gluten flowing off with the water. The more rapidly the starch settles the greater will be the amount of impurities carried with it.

My invention depends upon the characteristic of the lighter elements in an impure watery starch mixture to rise to the top and to remain at the top if they are made to travel at a proper speed, and on the principle that the greatest separation of impurities and consequently the purest starch will be obtained where the settling is delayed so that the impurities are given an opportunity to become free from the starch. By combining these two principles it is possible to obtain a pure starch still in the form of a water mixture, so that the pure starch may be piped from the separators to any desired point in order that it may be put through a second separator if the greatest possible refinement be desired or be utilized directly in any other manner as a watery mixture.

My improved method, generally speaking, consists in forming a body of watery starch, preferably having a considerable length or width at the top, keeping the starch agitated enough to cause it to remain in suspension without settling, and moving the gluten as it rises to a discharge point at a rate sufficient to prevent it from settling; the gluten being removed at the discharge point, preferably as an overflowing watery mixture, and the purified starch being drawn off in the form of a watery mixture, preferably from a point at the bottom of the liquid body.

Figure 2:
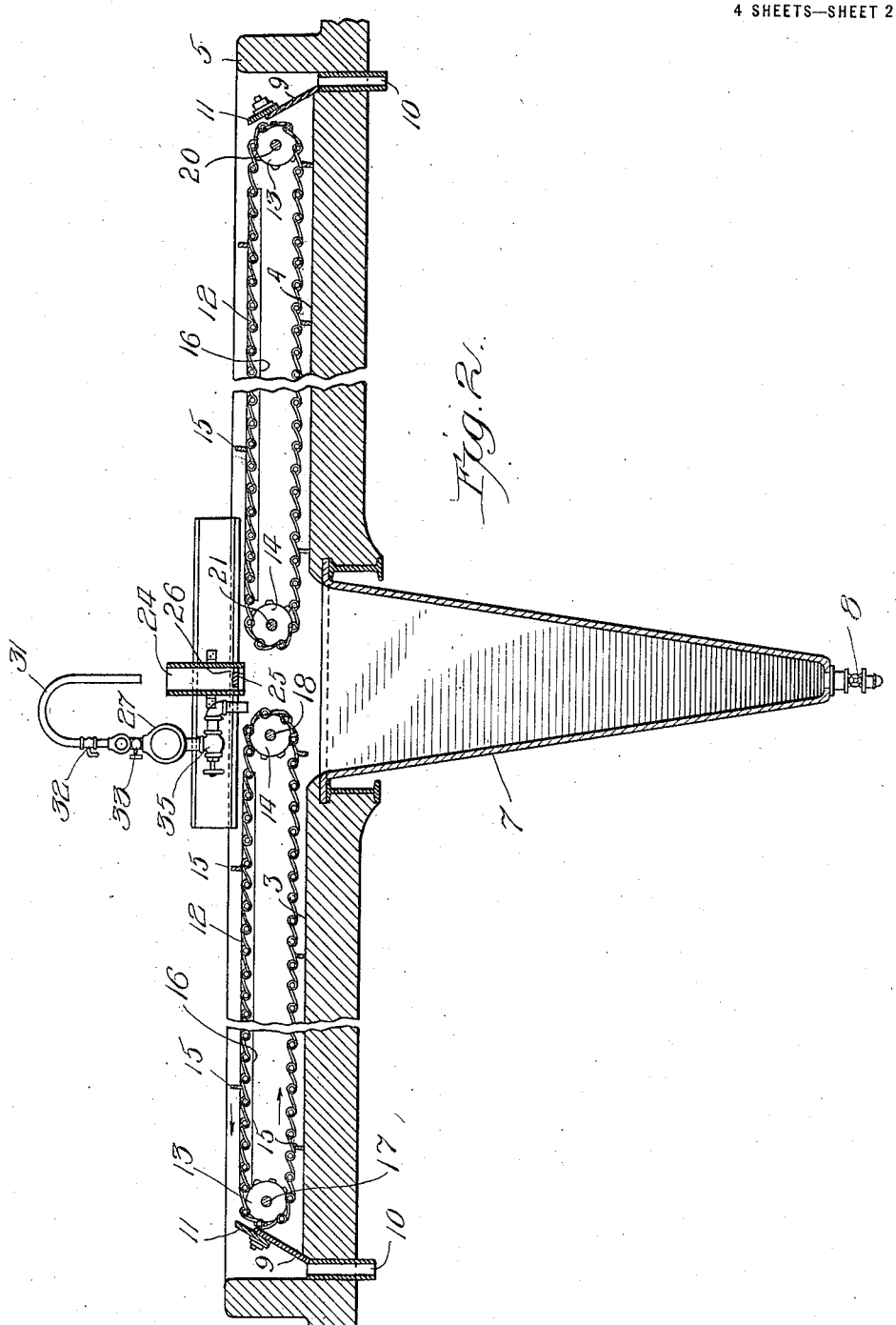
Figure 3:
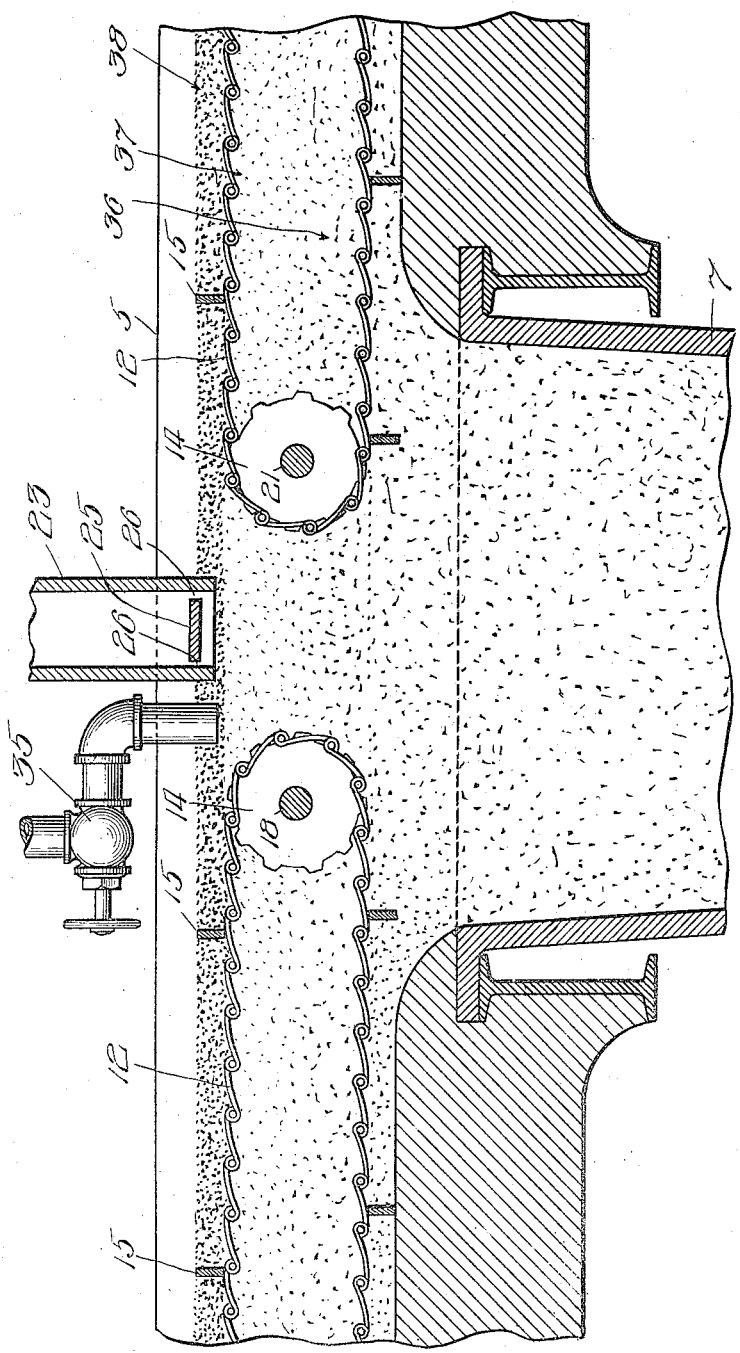

My improved method will be best understood from a reference to the preferred form of apparatus for carrying it out illustrated in the accompanying drawings, wherein:

Figure 1 is a top plan view of the apparatus; Fig. 2 is a central vertical section on line 2—2 of Fig. 1; Fig. 3 is a section corresponding to Fig. 2, on an enlarged scale, only a portion of the apparatus being shown; Fig. 4 is a section on line 4—14 of Fig. 1 on a larger scale; and Fig. 5 is a section on line 5—5 of Fig. 1.

Referring to the drawings, 1, 2, 3 and 4 represent four tables arranged in two pairs lying side by side, the tables of each pair being arranged end to end. Around the edge of the set of four tables is a continuous wall, 5, of any desired height. In actual practice I have made each table about twenty-five feet long and the wall about a foot high, although these proportions may of course be varied. Between the two pairs of tables is a dividing wall, 6, which may be the same height as the wall 5. The adjacent ends of the tables of each pair are spaced apart and in the space thus left between the ends of the four tables at the center of the apparatus is placed a hopper, 7, which is preferably of a considerable depth. The dividing wall 6 need not be made continuous but may be interrupted at the top. If desired, the tables may be made to slope slightly, being lowest at the ends next to the hopper. It will thus be seen that the construction which I have just described constitutes in effect a hopper having a greatly enlarged mouth separated into two individual compartments at each side of the main portion of the hopper. Or, in still more general terms, the structure constitutes a receptacle having its mouth widened greatly so as to make one dimension of the surface of a body of liquid in the receptacle of considerable length. Therefore, while I have illustrated and described particularly a single practical construction, my invention is not limited to the particular arrangement thus illustrated and described.

Associated with the hopper and the tables connected therewith are means for supplying impure watery starch or any other watery mixture holding in suspension substances differing in specific gravity or in their settling properties, means for agitating or stirring the liquid in proximity to the upper surfaces of the tables so as to prevent settling of the starch or other heavy particles and permitting the lighter particles to become separated and rise, means for moving the body of lighter particles which have risen to the surface to a discharge point or points, means for withdrawing the lighter particles in the form of a watery mixture at the discharge point or points, and means for withdrawing the watery mixture containing purified starch or other heavy particles from the hopper.

In the particular arrangement illustrated there is a suitable discharge outlet, 8, in the bottom of the hopper so that the settling starch is compelled to flow out of the hopper and can find no supporting surface on which it may collect. Near each end of each table, at a short distance within the inclosing wall 5 is a transverse partition, 9, somewhat lower than the outside wall and the partition walls. The walls 9 are preferably inclined, being closer to the end walls at the bottom than at the top. The transverse walls 9 form with the main walls trough-shaped receptacles, one at the outer end of each table and, from the bottom of each of these troughs extends a suitable outlet passage, 10. With this arrangement, when the apparatus is filled with liquid to a height slightly above the tops of the transverse walls 9, some of the liquid will flow across these walls and out through the discharge passages 10. Each wall 9 is preferably provided with a vertically adjustable upper portion, 11, by means of which the effective heights of these walls may be varied. Above each table is arranged a suitable agitator for the liquid in the vicinity of the surface of the table, together with suitable means for positively moving floating material at the surface of the liquid toward the receiving trough at the end of the table. In the arrangement shown, the agitating means and the propelling means for the floating material are combined in a single mechanism; there being arranged above each table two endless belts or chains, 12, each of the bents or chains passing over a sprocket wheel or pulley, 13, mounted adjacent to the corresponding transverse wall 9 and over a similar pulley or sprocket wheel, 14, arranged above the main portion of the hopper. The parts are so arranged that one of the chains or belts lies adjacent to one side wall of the table while the other chain or belt lies adjacent to the opposite side wall. The two chains or belts are connected at intervals by suitable cross pieces, 15, which are preferably arranged so that they lie on top of the upper half of each chain. The cross pieces on the lower half of the chains rest upon the surface of the table while the cross pieces at the top are preferably allowed to rest at their ends upon tracks, 16, secured to the side walls of the table. The parts are so arranged that the upper half of the chains and the cross pieces lie in a plane just below the tops of the transverse walls 9. The several sets of chains or belts may be driven in any suitable way so that the cross pieces on the upper side of each set travel away from the hopper while the cross pieces on the lower sides travel toward the hopper. In the arrangement shown, the sprocket wheels or pulleys 13 asso with the tables 1 and 3 are mounted on a common shaft, 17, suitably journaled in the walls of these tables while the corresponding sprocket wheels or pulleys 14 are mounted on a single shaft, 18, provided with a suitable pulley, 19, or other device by means of which it may be driven. In the same way the sprocket wheels or pulleys at one end of the tables 2 and 4 are mounted on a common shaft, 20, while those above the hopper are mounted on a suitable shaft, 21, having a driving pulley, 22, or other suitable device by which it may be driven from one end.

Above the hopper and extending transversely of the tables are two boxes, 23 and 24, arranged end to end, one of the boxes lying above that portion of the hopper between the tables 1 and 2 and the other lying above that portion of the hopper situated between the tables 3 and 4. The boxes are open at the top while the bottom of each box is made of a member, 25, which is slightly narrower than the interior of the box so as to leave a narrow channel or passage, 26, between each of its long edges and the adjacent wall of the box. The lower ends of the boxes extend down substantially to or even a little below the plane containing the top edges of the transverse walls 9 at the ends of the tables.

The watery mixture to be operated upon may be supplied through a suitable pipe, 27, extending in proximity to the boxes 23 and 24 and having connected thereto horizontal manifolds, 29 and 30, each of which is adjacent to one of the boxes 23 and 24. Each manifold is provided with a series of small pipes, 31, whose discharge ends are located above the corresponding boxes, the pipes being distributed along the manifolds so that each will discharge into the corresponding boxes at a point spaced apart from the point of discharge of any other pipe. I prefer to make the pipes 31 in the form of inverted U's and to arrange in the first leg of each pipe a suitable regulating valve, 32. With this arrangement the stream from each pipe may be regulated independently. A suitable valve, 33, may be placed between each of the manifolds and the main supply pipe, the cutting off of the supply to a box being accomplished by closing the valve 33 without making it necessary to disturb the regulating valves 32.

The main supply pipe may be provided with a valved outlet, 35, adapted to discharge directly into the hopper, so that, when desired, the impure watery starch may be admitted rapidly directly into the hopper; thus making it possible to fill the apparatus quickly when it is first started.

The apparatus is used as follows: Assuming that the apparatus is empty, the valved discharge outlet 35 connected with the main supply pipe may be opened so as to fill the hopper quickly with the impure watery mixture and, for the sake of clearness and brevity I shall refer to this impure watery mixture as watery starch to be purified although, as I have heretofore stated, my invention is not necessarily limited to this particular use. When the hopper becomes full the liquid overflows upon the tables, being confined by the inclosing wall, until it reaches the tops of the transverse walls 9 at the extreme ends of the tables. The valved outlet 35 is now closed and the valves 33 are opened so that further supply to the apparatus comes through the delivery pipes 31 and passes down through the boxes 23 and 24 before reaching the body of liquid already present in the apparatus. The bottom walls of the boxes check the descent of the streams so that the liquid flows gently out through the long narrow passages in the bottom of the boxes and gently enters the body of liquid in the apparatus. The endless belts or chains are set in motion, the cross pieces or bars on the lower sides traveling along on top of the tables from the outer ends toward the hopper, while the cross pieces or bars on the top side travel from the hopper outwardly at or slightly below the liquid level. As the liquid is supplied to the apparatus, the outlet 8 at the bottom of the hopper being open, some of it flows out through the outlet 8 and some overflows into the troughs at the ends of the table and from there is discharged through the outlets 10. The several outlets are so proportioned that the contents of the apparatus are discharged at the same rate at which the impure watery starch is supplied, so that after all the adjustments have been made and the heights of the transverse walls 9 have been properly determined, the action is continuous and automatic and the results produced are uniform at all times.

As the watery mixture enters the apparatus, it is in the form of water holding in suspension the finely divided particles of starch, gluten and other impurities. The starch immediately tends to settle and the gluten begins to rise. As the gluten rises it is carried by the current at the surface of the liquid, and positively by the upper cross pieces or bars along the surface and is finally delivered into the troughs at the ends of the tables; the rate at which the cross pieces or bars travel being such that the natural tendency of the gluten to settle after having risen is overcome and all the gluten which has once been separated in the settling action remains in a separated state and is finally delivered in the form of a watery mixture into the trough at the ends of the table. The separation of the impurities from the starch begins as soon as the watery mixture enters the apparatus and continues along the tables. The natural tendency of the starch to settle on the tables is prevented by the gentle stirring or agitation of the liquid just above the tables by the endless chains or belts and the cross pieces or bars, so that the starch in that portion of the liquid above the tables remains in suspension and any which should happen to settle on the tables would immediately be scraped away into the hoppers so that there can be no caking of the starch. The result is that after the apparatus has been in operation for a short time there is established in the liquid body therein the following conditions: all but a small part of the glutten will have become separated from the starch and will have risen to the top, the main body of the watery mixture being simply a purified watery starch; the water starch being densest at the bottom of the hopper and gradually becoming lighter toward the top of the liquid body. Thus, in actual practice, the density at the bottom of the hopper will be in the neighborhood of about 20 degrees Baumé, just above the tables the density will be about 12 degrees Baumé, while the surface layer will be of a density of somewhat less than 1 degree Baumé.

The deep body of purified watery starch may be regarded as made up of a series of superposed strata each of less density than the one below it so that if there should be a greater separation of starch above one table than above the others there will be an adjustment of levels in the various strata throughout all of the tables, preventing all danger of choking one or more of the tables. In other words, if there should be a greater amount of starch tending to settle above one of the tables, the flow of watery starch from this table to the hopper will be greater than from another table where there is less starch and the balance of the system will be maintained. This adjustment of the purified watery starch does not affect the surface level, that is the level of the surface of the layer containing the gluten, since the upper surface of the entire body of liquid will of course always remain level. Consequently, if the heights of the transverse walls 9 are properly determined, the gluten will always be properly removed regardless of any readjustment which may take place in the body of purified watery starch.

In Fig. 3 I have in a general way illustrated the several layers, 36, representing the purified watery starch, and 38 representing the upper layer containing the impurities.

It will be seen that the endless chains or belts with their cross pieces serve not only to move the gluten at a speed sufficient to prevent settling and prevent the starch from caking by keeping the starchy mixture just above the surface of the tables gently agitated, but they also serve to increase the amount of separation by allowing the impurities which would otherwise be carried down with the starch to become separated and rise; so that impurities which would be carried down upon the table by starch tending to settle near the hoppers, will be given an opportunity to become separated and to rise at some point along the table so that finally it will reach the upper layer and be carried away with the rest of the gluten.

Of course, in starting the apparatus in the manner heretofore explained, the first hopper full of liquid will not be purified to any great extent because as the hopper is being filled the gluten which tends to rise will be driven down by the incoming mixture and will not have an opportunity to become separated so as to rise to the top when the hopper is full. Therefore in starting the apparatus in this way, the mixture discharged from the hopper must be collected and again be passed through the same separator or another one. Thereafter, however, the impure watery starch is supplied only at the upper surface of the body of liquid in the apparatus and its natural tendency is to flow gently in both directions away from the hopper, that is above the tables.

It will thus be seen that I have produced a simple apparatus which, after being once adjusted, may be operated continously for a definite length of time without requiring any attention whatever, the apparatus serving as a means to cause a body of impure watery starch to be separated into two layers, a comparatively thin upper layer of liquid containing impurities, and an under layer in the form of a deep body of purified watery starch increasing gradually in density from the top to the bottom; this condition being automatically maintained by the mere act of receiving regulated quantities of impure watery starch and withdrawing regulated quantities of purified watery starch and of a watery mixture containing the impurities. However, while the particular apparatus illustrated is one well adapted to carry out my new method, I do not desire to be limited to the particular structural details or arrangement of parts shown, in so far as the apparatus is concerned, but intend to cover all forms and arrangements which fall within the terms employed in the definitions of my invention, constituting the appended claims.

Furthermore, while I have described my invention as carried out for the purpose of separating gluten from starch and have referred to starch as the material to be purified and to the gluten as the impurities, I do not desire to be limited to this particular use or to one in which the impurities are lighter than the material to be purified, since in the appended claims I use the word "impurities" rather in the sense of the lighter of two materials to be separated from each other than in the sense of the literal meaning.

I claim:

1. The method of recovering a comminuted material from a watery mixture containing the same and impurities of less specific gravity held in suspension, which consists in maintaining a body of said mixture, gently agitating the mixture at a level considerably below the surface so as to hold the said material in suspension, causing the rising impurities to move across the surface at a rate sufficient to prevent them from settling, and withdrawing watery material from the bottom of said body and impurities from the surface.

2. The method of recovering a comminuted material from a watery mixture containing the same and impurities of less specific gravity held in suspension, which consists in maintaining a comparatively deep body of such mixture, gently agitating the mixture throughout a zone lying a considerable distance below the surface so as to permit the impurities to rise to the top of a purified watery mixture of said material increasing gradually in density from the top to the bottom, causing the impurities collected at the top to move horizontally at a rate sufficient to prevent them from settling, and withdrawing the purified watery material from the bottom of said body and the impurities from the top.

3. The method of recovering comminuted material from a watery mixture containing the same and impurities of less specific gravity held in suspension, which consists in maintaining a thick body of said mixture, gently agitating the mixture at a level considerably below the surface so as to permit said material to settle to such lower level and be there held in suspension, positively moving the rising impurities across the surface at a rate sufficient to prevent them from settling, and withdrawing watery material from the bottom of said body and impurities from the surface.

4. The method of recovering comminuted material from a watery mixture containing the same and impurities of less specific gravity held in suspension, which consists in maintaining a comparatively deep body of such mixture, gently agitating the watery mixture in a zone lying a considerable distance below the surface so as to retard the rate of settling of the said material and permit a maximum amount of said impurities to rise to the top, positively moving the impurities collected at the top horizontally to an overflow point at a rate sufficient to prevent them from settling, and withdrawing the purified watery mixture from a point below said zone.

5. The method of recovering comminuted material from a watery mixture containing the same and impurites of less specific gravity held in suspension, which consists in maintaining a comparatively deep body of said mixture in a suitable receptacle, gently agitating the mixture at a level considerably below the surface so as to hold the said material in suspension at and below said level, positively moving the rising impurities across the surface toward an overflow point at a rate sufficient to prevent them from settling, and withdrawing purified watery material from a point below said level.

6. The method of recovering comminuted material from a watery mixture containing the same and impurities of less specific gravity held in suspension, which consists in maintaining a body of such mixture of a considerable depth, gently agitating the mixture in a zone lying below the surface so as to retard the settling of said material and permit the impurities to rise, causing the surface layer to move toward an overflow point at a rate sufficient to prevent the impurities from settling, and withdrawing the purified watery material from the bottom.

7. The method of recovering starch from a watery mixture containing the same and impurities of less specific gravity, which consists in maintaining a body of said mixture, gently agitating the mixture at a level considerably below the surface so as to hold the starch in suspension, positively moving the rising impurities across the surface at a rate sufficient to prevent them from settling, and withdrawing watery starch from the bottom of said body and impurities from the surface.

8. The method of recovering starch from a watery mixture containing the same and impurities of less specific gravity, which consists in maintaining a body of such mixture of a considerable depth, gently agitating the mixture at an appreciable depth below the surface so as to retard the settling of said material and maintain said body in a fluid state increasing gradually in density from the top to the bottom and allow a maximum amount of impurities to rise to the top, moving the impurities collected at the top horizontally at a rate sufficient to prevent them from settling, and withdrawing the purified watery starch from the bottom and the impurities from the top.

9. The method of recovering starch from a watery mixture containing the same and gluten, which consists in maintaining a body of said mixture, allowing the starch to settle slowly and yet remain in suspension so as to permit the gluten to rise to the top, positively moving the gluten across the surface at a rate sufficient to prevent it from settling, and withdrawing starch in the form of a watery mixture from the bottom of said body and withdrawing gluten from the surface level.

10. The method of recovering starch from a watery mixture containing the same and gluten, which consists in maintaining a body of said mixture, withdrawing watery starch from the bottom of said body, keeping the starch in suspension until it is withdrawn and thus allow a maximum percentage of the gluten to rise, positively moving the gluten across the surface at a rate sufficient to prevent it from settling, and withdrawing the gluten at the surface level.

11. The method of recovering starch from a watery mixture containing the same and gluten, which consists in maintaining a body of said mixture, withdrawing watery starch from the bottom of said body, keeping the starch in suspension until it is withdrawn and thus allow a maximum percentage of the gluten to rise, positively moving the gluten across the surface at the rate of twelve feet a minute or more, and withdrawing the gluten from the surface level.

12. The method of recovering starch from a watery mixture containing the same and gluten, which consists in maintaining a body of said mixture, allowing the starch to settle partially and yet remain in suspension so as to permit the gluten to rise to the top, positively moving the gluten across the surface at a rate sufficient to prevent it from settling, and withdrawing starch in the form of a watery mixture from the bottom of said body and withdrawing gluten from the surface level.

In testimony whereof, I sign this specification in the presence of two witnesses.

LOUIS P. BAUER.

Witnesses:
F. M. BLACK,
E. E. BLACK.